Dec. 22, 1959      D. W. MURPHY      2,918,324
JAW ASSEMBLY UNIT FOR AIRCRAFT PYLONS
Filed Nov. 12, 1954
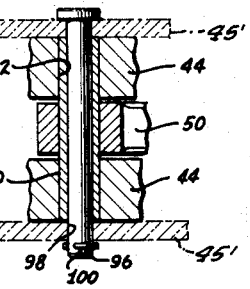
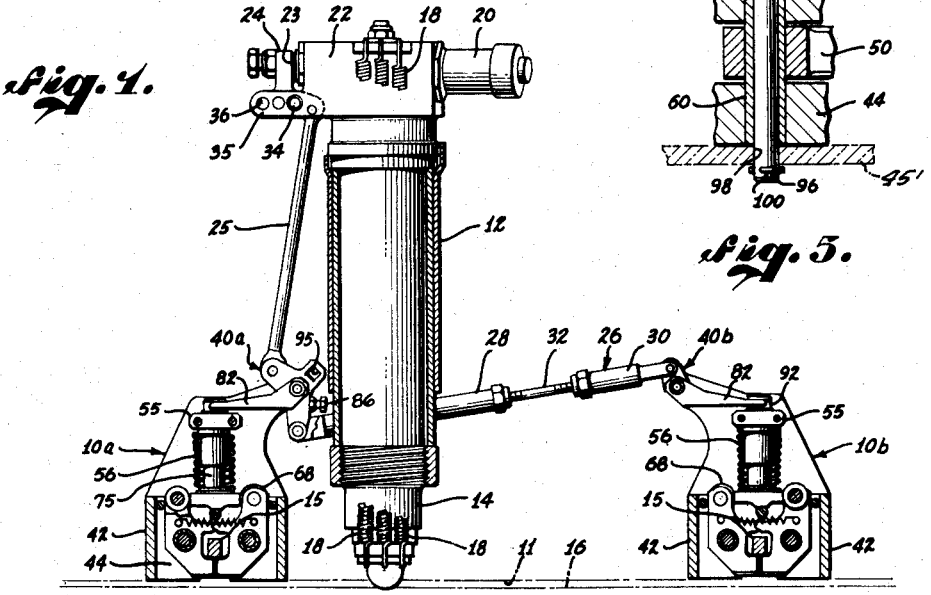
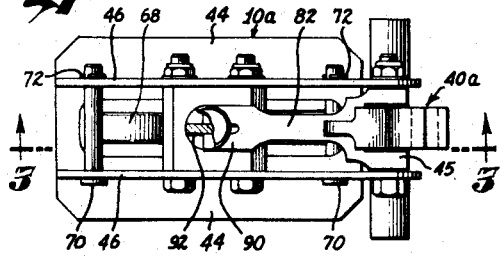
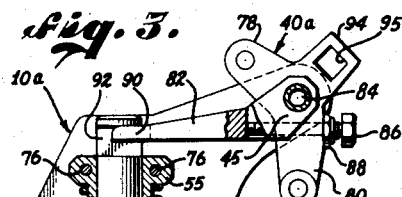
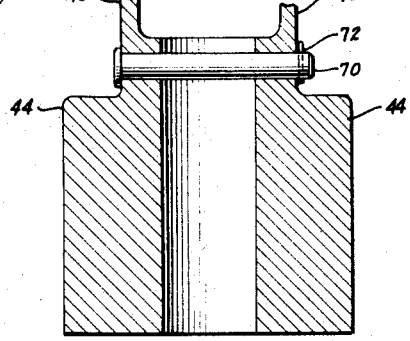
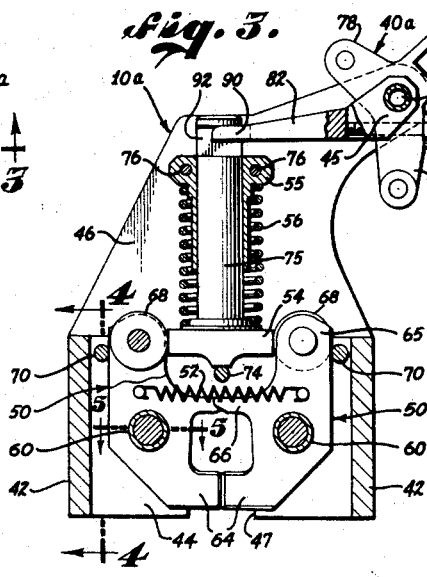
DAVID W. MURPHY,
INVENTOR.
BY *George V. Smyth*
ATTORNEY.

United States Patent Office 2,918,324
Patented Dec. 22, 1959

2,918,324

JAW ASSEMBLY UNIT FOR AIRCRAFT PYLONS

David W. Murphy, Torrance, Calif., assignor to Pastushin Aviation Corporation, Los Angeles, Calif., a corporation of California Application November 12, 1954, Serial No. 468,225

5 Claims. (Cl. 294—83)

This invention relates to means for use on an aircraft to releasably engage stores such as fuel tanks that are to be jettisoned in flight and the invention is particularly directed to a jaw assembly unit for releasable engagement with the shackle of such a store.

At least two pairs of jaws of the type to which the invention pertains are incorporated in the structure of a pylon for use on the underside of an aircraft wing in combination with means also in the pylon for ejecting the store. The pairs of jaws engage corresponding shackles of the store and are automatically actuated to release the shackles when the ejecting means operates.

The ejecting means may, for example, comprise a piston adapted to be actuated by the combustion of an explosive charge. In the desired sequence of steps in the operation of jettisoning the store, the explosive is first detonated to create abruptly rising pressure against the piston and then the pairs of jaws are actuated early in the pressure rise to release the shackles of the store. For this purpose the jaws and their associated mechanisms may be appropriately designed and constructed to operate in response to the same pressure rise that actuates the ejection piston.

Each pair of jaws is in the form of a pair of pivoted jaw members having arms that swing towards each other when the jaws open. A first spring means tends to open the jaws and a locking member is normally positioned between the two jaw arms to hold the jaws closed in opposition to the spring means. A second spring means normally holds the locking member in locking position. Suitable means is provided to retract the locking member in response to the pressure rise caused by the explosive thereby to permit the two jaws to fly apart for release of the store that is to be jettisoned.

It has been found that equipping a pylon structure with such pairs of jaws is an expensive and time-consuming task because the jaws and their associated mechanisms have numerous working parts that must be carefully assembled in effective cooperating relationship. The problem is complicated by the fact that a pylon is necessarily a relatively narrow streamlined structure affording poor accessibility. It is also to be borne in mind that the various jaw mechanisms must be synchronized with each other and must be additionally adjusted for correct timing relative to the operation of the ejection piston.

The present invention meets this problem successfully by constructing each pair of jaws and its associated mechanism as a packaged assembly or unit that may be fabricated and tested for operation separate and apart from the pylon. In this regard one feature of the preferred embodiment of the invention is that such a jaw assembly unit may be easily and quickly mounted in the pylon merely by extending two bolts through the unit and through the adjacent walls of the pylon. A further feature is that a plurality of jaw assembly units may be operatively interconnected and even adjusted for synchronism outside of the pylon and then installed in the pylon. Thus to install two or more pairs of jaws and associated mechanisms in a pylon for engaging corresponding shackles of an auxiliary disposable fuel tank, the steps may consist simply of, first, operatively interconnecting a corresponding number of the jaw assembly units outside of the pylon, then installing the units in the pylon by means of corresponding pairs of bolts, and, finally, operatively connecting one of the units with whatever actuating means is provided in the pylon for release operation of the pairs of jaws.

In the preferred practice of the invention, each jaw assembly unit comprises an individual housing with a jaw mechanism mounted therein, this housing being open at the bottom to receive a store shackle and being dimensioned to fit between the two side walls of a pylon. Preferably the housing is a hollow casting of rectangular configuration in plan formed with two parallel side walls and two parallel end walls.

Various transverse elements are mounted in the two side walls of the housing in position spanning the hollow interior. These elements may include various pivot members and stop pins as well as means to secure a guide for a locking member. In this regard a feature of the preferred embodiment of the invention is the use of hollow elements to serve not only as pivot members for the pair of jaws of the unit, but also to serve as means to receive bolts for mounting the unit inside a pylon. In the present disclosure the side walls of the unit housing are apertured to receive two sleeves for journalling the jaw members of the unit and two bolts for mounting the unit in a pylon are extended through these sleeves.

The preferred practice of the invention is further characterized by the concept of incorporating a multiple-purpose bell crank in at least one of the jaw assembly units that are to be mounted in a pylon. One function of the special bell crank is the primary function of retracting the locking member to cause the two jaws to fly open when the store is to be jettisoned. Another function of the special bell crank is to serve as means to permit the mechanism of the various jaw assembly units to be synchronized with each other. For this purpose the special bell crank is so constructed that the angular relationship between two of its arms may be varied by means of a simple adjustment screw. A third function of the special bell crank is to serve as means for manually opening or cocking the jaws in preparation for engagement with the shackle of a store.

The various features and advantages of the invention may be understood from the following detailed description considered with the accompanying drawing.

In the drawing, which is to be regarded as merely illustrative:

Figure 1 is a view partly in side elevation and partly in section showing two of the jaw assembly units mounted in a pylon and operatively connected to a fluid-actuated means for ejecting a store;

Figure 2 is a plan view of one of the jaw assembly units with a portion broken away;

Figure 3 is a longitudinal section taken as indicated by the line 3—3 of Figure 2;

Figure 4 is a transverse section taken as indicated by the line 4—4 of Figure 3; and Figure 5 is a section taken as indicated by the line 5—5 of Figure 3.

Figure 1 shows, by way of example, two jaw assembly units designated 10a and 10b, respectively, which embody the presently preferred practice of the invention. The two jaw assembly units 10a and 10b are mounted in the pylon adjacent the bottom edge 11 of the pylon and are operatively connected to a power cylinder 12 that has a main piston 14 for exerting ejection force against a store. Each of the jaw assembly units is intended to engage a corresponding shackle 15 of a store 16, such as an auxiliary fuel tank, to hold the store adjacent the bottom of the pylon in a well known manner. The main piston 14 normally rests against the top side of the store 16, as shown, so that downward movement of the piston will eject the store away from the aircraft. In this instance the main piston is provided with a plurality of springs 18 that retract the piston after the store is ejected.

An explosive charge in a cartridge 20 that is equipped with suitable electrical detonation means causes the rapid generation of gases in a combustion chamber 22 for outward propulsion of the main piston 14. The generated gases also create pressure against an auxiliary piston 23 that rocks a bell crank 24, the purpose of the bell crank being to actuate the two jaw assembly units 10a and 10b. In this instance the jaw assembly unit 10a is operatively connected to the bell crank 24 by a suitable operating rod 25 and the two jaw assembly units 10a and 10b are operatively interconnected by a suitable connecting rod 26. The connecting rod 26 is adjustable in length and for this purpose comprises two tubular sections 28 and 30 adjustably interconnected by a threaded rod 32.

The bell crank 24 has a plurality of pivot holes (not shown) which may be used selectively for engagement with a pivot means 34 and the bell crank is mounted in a bracket 35 which has a plurality of bores 36 that may be used selectively for the pivot means 34. Thus the effective lengths of the two arms of the bell crank 24 may be varied relative to each other and the position of the bell crank may be varied relative to the auxiliary piston thereby to permit adjustment in the timing of the operating movement of the operating rod 25 relative to the pressure rise in the combustion chamber 22. Thus the timing of the release actuation of the two jaw assembly units 10a and 10b may be adjusted with respect to the downward thrust of the main piston 14.

The two jaw assembly units 10a and 10b are identical in construction except for the fact that the jaw assembly unit 10a includes a special adjustable bell crank 40a and the unit 10b includes, instead, a simple conventional bell crank 40b. The detailed construction of the jaw assembly unit 10a is shown in Figures 2 to 5.

The mechanism of the jaw assembly unit is mounted in a housing in the form of a hollow casting of rectangular configuration in plan, the casting being open at the top and bottom. The casting has two end walls 42 and two relatively thick side walls 44 dimensioned to fit relatively snugly between the side walls 45' of a pylon, as indicated in Figure 5. The two side walls 44 of the casting are continued upward to provide a pair of spaced parallel wings 46 which, as shown in Figures 2 and 4, are offset inwardly from the outer surfaces of the casting side walls 44. Each of the side walls 44 has a slot 47 to clear a store shackle 15.

The principal parts of the mechanism of the jaw assembly unit includes a pair of jaw members 50, a first yielding means in the form of a coiled spring 52 to urge the two jaw members to open position, a locking member 54 to hold the two jaw members in their normal closed positions, a guide means 55 for the locking member, a second yielding means in the form of a coiled spring 56 to urge the locking member into its normal locking position, and, finally the previously mentioned bell crank 40a for retracting the locking member.

Each of the two jaw members 50 is mounted on a suitable pivot means 60 which preferably is in the form of a bushing or sleeve (Figures 3 and 5) mounted with a forced fit in suitable bores 62 in the side walls 44 of the housing casting. Each of the jaw members 50 has a lower arm in the form of a hook-shaped jaw 64, an upper locking arm 65 and an auxiliary finger 66. The two auxiliary fingers 66 overlap and the two jaws normally meet to form a loop for engaging a shackle 15 of a store. Preferably the upper ends of the two locking arms 65 are provided with suitable rollers 68 for cooperation with the locking member 54.

A pair of headed pins 70 mounted transversely across the housing casting and secured by cotter pins 72 serve as stops for the two locking arms 65, respectively, to limit the outward rotation of each of two locking arms and a third similar transverse pin 74 is positioned between the two locking arms to serve not only as stop means for limiting the opposite rotation of each of the two locking arms, but also as stop means to limit the downward movement of the locking member 54 at its normal locking position between the two rollers 68.

The locking member 54 is preferably formed with an upwardly extending guide shank 75 that is slidingly mounted in the guide means 55. The guide means 55 is of tubular construction and is enlarged at its upper end, as shown, to span the interior of the housing casting and to receive a pair of bolts 76 by means which it is fixedly anchored inside the housing. The previously mentioned coiled spring 56 embraces both the guide means 55 and the guide shank 75 with the spring in compression against the locking member 54.

The special bell crank 40a has three arms, namely, an arm 78 for operative connection with the previously mentioned operating rod 25, a second arm 80 for operative connection with the previously mentioned connecting rod 26, and a third arm 82 for retraction of the locking member 54. The two arms 78 and 80 are integral with each other to form the body of the bell crank and are pivotally mounted on a cross bolt 84 carried by the two housing wings 46.

The third arm 82 of the special bell crank 40a is formed with a fork 45 at its inner end that straddles the body of the bell crank and is pivoted on the cross bolt 84. Thus the third arm 82 is pivoted for angular movement relative to the two arms 78 and 80. A suitable adjustment screw 86 having a hexagonal head is threaded into the body of the special bell crank for abutment against the pivoted arm 82 to determine the relative angular position of the pivoted arm as desired. A suitable lock nut 88 is threaded onto the adjustment screw 86 to immobilize the adjustment screw at selected positions.

The third arm 82 of the bell crank 40a may be operatively connected with the locking member 54 in any suitable manner. In the construction shown the outer end of the bell crank arm 82 forms a fork 90 for engagement with the upper end of the locking member shank 75. For this purpose the upper end of the shank is cut away on both sides to form a narrow neck 92 to receive the fork 90.

Preferably the special bell crank 40a is suitably adapted for cooperation with a suitable tool whereby the mechanism of the jaw assembly unit may be actuated when desired to open the two jaws 64 to receive a shackle 15. For this purpose the body of the bell crank 40a may be formed with a socket portion 94 defining a square socket 95.

The manner in which the invention serves its purpose may be readily understood from the foregoing description. It is a simple matter to install a jaw assembly unit 10 in a pylon since it is necessary merely to insert the unit into the pylon and to insert suitable means through the two bushings 60 to anchor the unit. Thus, Figure 5 shows how a headed pin 96 may be inserted through aligned bores 98 in the two side walls 45' of the pylon and through a previously described bushing 60 to interconnect the jaw assembly unit and the pylon. The headed pin is secured by a cotter pin 100.

Prior to installation of the two jaw assembly units 10a and 10b, the unit 10a may be connected to the operating arm 25 and the two units may be interconnected by the connecting rod 26. Also prior to installation of the two jaw assembly units the mechanisms of the two units may be synchronized relative to each other by manipulation of the adjustment screw 86 of the special bell crank 40a and, if desired, by additional adjustment in the effective length of the connecting rod 26. Such adjustment may be carried out accurately by anchoring the two jaw assembly units in their correct relative positions on a suitable jig. The two interconnected jaw assembly units may then be slipped into the interior of the pylon and anchored in place by installation of four headed pins 96 through the four unit bushings 60 as heretofore described.

After the two units are installed in the pylon it is a simple matter to connect the upper end of the operating rod 25 to the actuating bell crank 24. The timing of the release action of the two jaw assembly units relative to the operation of the auxiliary piston may be varied as desired by shifting the pivot means 34 in the bracket 35 and in the bell crank 24.

To cock the two jaw assembly units 10a and 10b, i.e., to open their jaws to receive the corresponding shackles 15 of the store, a suitable wrench is inserted through an opening (not shown) in the side of the pylon for engagement with the square socket 95 of the special bell crank 40a. The bell crank 40a is then rotated clockwise as viewed in the drawing, to cause upward retraction of the locking members 54 of both of the units in opposition to the coiled springs 56. The upward retraction of each locking member 54 permits the coiled spring 52 to swing the two associated jaw members 50 to open position and at such open positions the locking arms 65 of the two jaw members position the rollers 68 to prevent downward return movement of the locking member 54. When the shackle 15 of a store moves between the open jaws 64 of the two jaw members 50, it impinges on the overlapping auxiliary fingers 66 and moving against the auxiliary fingers in opposition to the coil spring 52 causes the two jaw members to rotate apart. When the jaw members 50 spread apart the locking member 54 is returned by the spring 56 to its normal lower locking position to lock the jaws.

When the bell crank 24 is operated in response to rising pressure in the power cylinder 12, the operating rod 25 actuates the special bell crank 40a and thereby causes the bell crank 40b of the second unit to be actuated by the connecting rod 26. The two bell cranks operate to lift the two corresponding locking members 54 to permit the coiled springs 52 to open the jaws 64 for release of the store shackles 15.

Although the now preferred embodiment of the present invention has been shown and described herein, it is to be understood that the invention is not to be limited thereto, for it is susceptible to changes in form and detail within the scope of the appended claims.

I claim:

1. In a jaw assembly for use in the structure of an airborne vehicle to releasably engage the shackle of a jettisonable store, wherein a pair of cooperating jaw members having locking arms are urged towards open positions by a first yielding means, a locking member is urged by a second yielding means from a retracted position towards an effective locking position between said locking arms, and means, including a bell crank, is operatively connected with said locking member for retraction thereof in opposition to said second yielding means, the improvement which comprises: a jaw housing having spaced side walls and an open bottom, said jaw members being pivotally mounted inside said jaw housing to form therewith a jaw unit for incorporation in said structure of the airborne vehicle; a guide tube rigidly mounted on said jaw housing; and a guide shank carrying said locking member and slidingly mounted in said guide tube for guiding the locking member between its effective position and its retracted position, said second yielding means being a coil spring embracing said guide tube in compression against said shank to urge said locking member towards its effective position, said bell crank being rotatably mounted on said jaw housing.

2. The improvement as set forth in claim 1, in which said bell crank has a noncircular recess spaced away from the axis of rotation of the bell crank for engagement by a tool for manual rotation of the bell crank to retract said locking member in opposition to said second yielding means.

3. The improvement as set forth in claim 1, in which one of the arms of the bell crank is pivoted for angular adjustment relative to the other; and in which an adjustment screw is mounted on the bell crank to vary the angle between the two bell crank arms thereby to vary the timing of the release action of the jaw members relative to the actuation of the bell crank.

4. The improvement as set forth in claim 1, in which said bell crank comprises two arms rotatable about a common axis, one of said arms being operatively connected to said locking member to retract the locking member thereby to permit said first yielding means to open said jaw members; and which includes screw means mounted in one of said arms of the bell crank bearing against the other arm to transmit actuating force from one of the arms to the other, said screw means being adjustable to vary the angle between the two arms.

5. In a jaw assembly for use in the structure of an airborne vehicle to releasably engage the shackle of a jettisonable store, wherein a pair of cooperating jaw members having locking arms are urged towards open positions by a first yielding means, a locking member is urged by a second yielding means from a retracted position towards an effective locking position between said locking arms, and means is operatively connected with said locking member for retraction thereof in opposition to said second yielding means, the improvement which comprises: a jaw housing having spaced side walls and an open bottom, said jaw members being pivotally mounted inside said jaw housing to form therewith a jaw unit for incorporation in said structure of the airborne vehicle; a guide tube rigidly mounted on said jaw housing; and a guide shank carrying said locking member and slidingly mounted in said guide tube for guiding the locking member between its effective position and its retracted position, said second yielding means being a coil spring embracing said guide tube in compression against said shank to urge said locking member towards its effective position.

References Cited in the file of this patent

UNITED STATES PATENTS

| | | |
|---|---|---|
| 1,578,754 | Paul | Mar. 30, 1926 |
| 1,714,954 | Hanson et al. | May 28, 1929 |
| 1,792,729 | Carter | Feb. 17, 1931 |
| 1,828,415 | Johnson | Oct. 20, 1931 |
| 2,466,980 | Bronson | Apr. 12, 1949 |